United States Patent

[11] 3,573,678

[72] Inventors William New, Jr.
Los Angeles;
Robert W. Newcomb, Palo Alto, Calif.;
Douglas E. Treter, Uncasville, Conn.

[21] Appl. No. 815,370
[22] Filed Apr. 11, 1969
[45] Patented Apr. 6, 1971
[73] Assignee The United States of America as represented by the Secretary of the Air Force

[54] DIRECT COUPLED VARIABLE GYRATOR
3 Claims, 1 Drawing Fig.

[52] U.S. Cl. .......... 333/80, 307/295
[51] Int. Cl. .......... H03h 7/44, H03h 11/00
[50] Field of Search .......... 333/80, 80 (T); 307/295, 322

[56] References Cited

UNITED STATES PATENTS 2,943,282 6/1960 Pfiffner .......... 333/80T(UX)
3,322,972 5/1967 Csanky .......... 333/80T(UX)
3,497,836 2/1970 Daniels .......... 333/80T(UX)
3,500,262 3/1970 Daniels .......... 333/80T(UX)

*Primary Examiner*—Herman Karl Saalbach
*Assistant Examiner*—Paul L. Gensler
*Attorneys*—Harry A. Herbert, Jr. and Willard R. Matthews, Jr.

ABSTRACT: The gyrator of the present invention comprises an electronic circuit arrangement of transistors and resistance means in combination with unique biasing means which permit gyrator operation without the normally required input and output blocking capacitors. Transistor means connected to the input and output terminals of the gyrator perform as current to voltage converters and cooperate with a third intermediate voltage inverting transistor means and appropriate biasing resistors to achieve gyrator realization. The biasing means which includes a stable voltage source such as a Zener diode permits gyrator input and output to remain at zero potential during periods when no signal is applied.

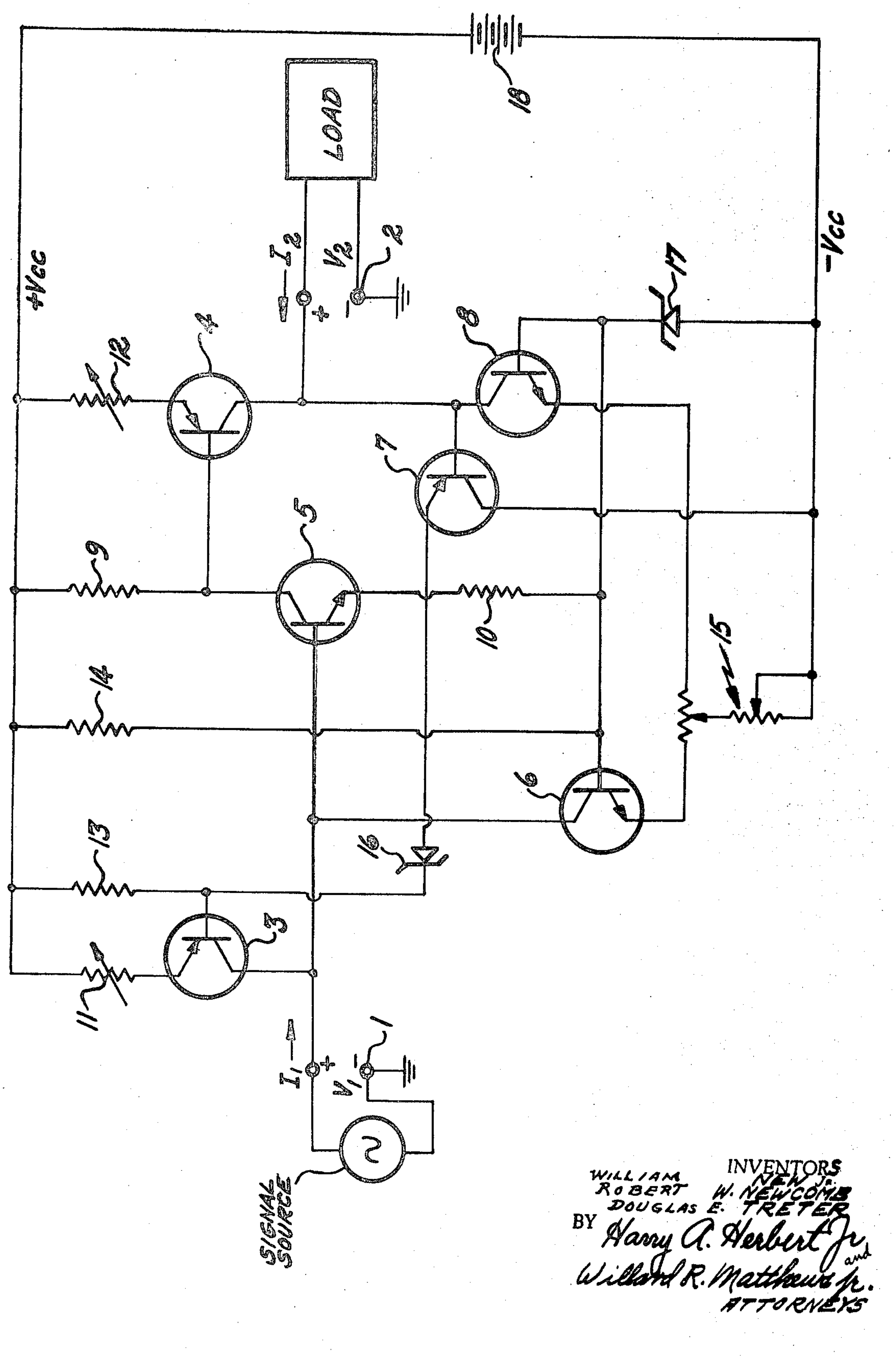
INVENTORS
WILLIAM NEW, Jr.
ROBERT W. NEWCOMB
DOUGLAS E. TRETER
BY Harry A. Herbert Jr. and Willard R. Matthews Jr.
ATTORNEYS

DIRECT COUPLED VARIABLE GYRATOR

BACKGROUND OF THE INVENTION

This invention relates to gyrators and more particularly to variable gyrators that may be incorporated into integrated circuits as time variable transformers, voltage controlled variable frequency resonators and the like.

A gyrator is a linear, active, four pole, electronic circuit element whose transmission properties are such that it is effectively a half wavelength longer for one direction of transmission than for the other direction of transmission. That is, it is a device that causes a reversal of signal polarity for one direction of propagation but not for the other. Gyrators have in the past found practical application in the field of microwave electronics through the use of ferrites whereby one way transmission and loss-less duplexing has been achieved. Ferrite devices however are capable of only very narrow band operation in and above the VHF range. More recently, efforts have been made to achieve gyrator realization by mechanically coupling piezoelectric and piezomagnetic transducers. Although the input and output impedances of these devices are large and frequency dependent, their antireciprocal behavior may be in kiloHertz range. An ideal gyrator is also capable of impedance inversion. Such a capability is of particular interest to integrated circuit designers. While most integrated circuit elements are very cheap, inductors are very expensive since they can be incorporated only with difficulty as actual elements in an integrated circuit and then only as fixed components. The need for variable inductance for tuning purposes in integrated circuits, therefore, has motivated considerable investigation into the possibility of utilizing gyrator impedance inversion characteristics to solve the problem. This can be accomplished by loading the gyrator with a capacitor and shunting the input port with another capacitor thereby obtaining a voltage controlled variable frequency resonator. Voltage controlled oscillators and amplitude and frequency modulators are also possible through application of these techniques. There is thus a definite need for the development of a gyrator circuit that not only is antireciprocal but also has very small input and output impedances. Then only can it be used as an efficient impedance inverter. Such a device should have properties very close to those of an ideal gyrator for the range of frequencies over which lumped element circuits are used because the gyrator as a lumped network forms, along with resistance and inductance (or capacitance) a complete set of fundamental network elements which are sufficient for the synthesis of all passive networks. A gyrator when terminated by an inductance (capacitance) can simulate a capacitance (inductance) because of its impedance inversion property. Ideal and perfect transformers can also be replaced by networks containing gyrators. Furthermore, since promising methods of time variable network synthesis as well as some aspects of analysis rely heavily on the time variable transformer and since such transformers can be constructed by cascading gyrators, there is a current need for the practical realization of a time variable gyrator and in particular to such a gyrator that is adaptable to integrated circuit fabrication and that does not require input and output blocking capacitors.

SUMMARY OF THE INVENTION

The present invention comprehends a gyrator circuit consisting of transistor and resistance elements in combination with unique biasing circuits which effectively eliminate the need for input and output blocking capacitors. The basic gyrator circuit comprises a first transistor means connected between the gyrator input port and the $+V_{cc}$ supply voltage, a second transistor means connected between the gyrator output port and the $+V_{cc}$ supply voltage and a third transistor means interconnected between the two. A variable resistance, $R_s$, is included in the circuit between the input transistor means and $+V_{cc}$ and another variable resistance $R_L$ is included between the output transistor means and $+V_{cc}$. The circuit arrangement is effective to permit the input and output transistor means to operate as current to voltage converters and the intermediate transistor means to operate as a voltage inverter. When resistances $R_S$ and $R_L$ are equal the output voltage ($V_2$) is:

$$V_2=R_S I_1 \qquad (1)$$

and the input voltage ($V_1$) is:

$$V_1=-R_L I_2 \qquad (2)$$

where $I_1$ and $I_2$ are source and load currents respectively. Equations (1) and (2) thus describe a gyrator.

The bias circuits include transistors, variable resistance means and stable voltage sources and are arranged to permit the gyrator input and output ports to remain at zero potential during periods when no signal is applied.

It is a principle object of the invention to provide a direct coupled variable gyrator that is readily adaptable to integrated circuit technology and manufacture.

It is another object of the invention to provide a direct coupled variable gyrator that does not require input and output blocking capacitors.

It is another object of the invention to provide a direct coupled variable gyrator that can effectively be utilized as a time variable transformer.

It is another object of this invention to provide a practical direct coupled variable gyrator having effective impedance inversion characteristics.

It is another object of this invention to provide a direct coupled variable gyrator wherein input and output ports remain at zero potential during periods when no signal is applied.

These, together with other objects, advantages and features of the invention, will become more apparent from the following detailed description when taken in conjunction with the illustrative embodiment in the accompanying drawing.

DESCRIPTION OF THE DRAWING

The sole FIGURE of the drawing is a schematic diagram of a direct coupled variable gyrator incorporating the principles of the present invention.

DESCRIPTION OF THE PREFERRED EMBODIMENT

Referring now to the sole FIGURE of the drawing, PNP transistor 3 is connected between input port 1 and the $+V_{cc}$ supply as shown and effectively operates as a current to voltage converter. PNP transistor 4 is connected between output port 2 and the $+V_{cc}$ supply and also operates as a current to voltage converter. NPN transistor 5 is connected across the $V_{cc}$ supply through resistors 9 and 10 and Zener diode 17 and its base is connected directly to input port 1. Resistor 9 is chosen to be equal to resistor 10 and the combination selected so as to place a negative voltage $V_1$ on the base and hence the emitter of transistor 4. Resistors 13 and 14 are for biasing purposes. Variable resistors 11 and 12 (referred to as $R_S$ and $R_L$ above) permit time variable operation of the device. In operation this basic gyrator portion of the device operates as follows: Considering only signal components the circuit configuration allows the load voltage $V_2$ to appear directly across resistor 11 ($R_S$). Since to a good approximation the source current $I_1$ flows through resistor 11

$$V_2=R_S I_1 \qquad (1)$$

Thus transistor 3 acts as a current to voltage converter. In comparison, transistor 5 acts as a voltage inverter since the resistance combination of resistors 9 and 10 place $-V_1$ on the base and emitter of transistor 4. Since the load current $I_2$ is to a good approximation, the current through resistor 12 transistor 4 is also a current to voltage converter and, observing polarities, $$V_1=-R_L I_2. \qquad (2)$$

When variable resistors 11 and 12 are equal, equations (1) and (2) describe a gyrator.

In order to make the device time variable, it is only necessary to vary resistors 11 and 12 such that both remain equal. This may be accomplished by using the source to drain resistance of a field effect transistor operated below pinch off.

With regard to the novel biasing circuits of the invention PNP transistors 6 and 8 provide the proper bias for transistors 3 and 5 through variable resistance means 15. Variable resistance means 15 can remain fixed after initial adjustment. PNP transistor 7 allows the base of transistor 3 to be raised above the collector of transistor 4 through the Zener diode 16, thus allowing the input and output ports to remain at zero potential with no signal applied. The Zener diode 17 raises the base of transistors 6 and 8 to allow for proper collector bias.

Although the present invention has been described with reference to a specific embodiment, it is not intended that the same should be taken in a limiting sense. Accordingly, it is understood that the scope of the invention in its broader aspects is to be defined by the appended claims only and no limitation is to be inferred from definitive language used in described the preferred embodiment.

We claim:

1. A direct coupled time variable gyrator comprising, an input terminal, an output terminal, first and second PNP transistors, an NPN transistor, first and second variable resistors, a first resistor, second and third resistors of equal value, a DC supply voltage source, said first PNP transistor having its collector connected to said input terminal, its emitter connected to the positive side of said DC supply voltage source through said first variable resistor and its base connected to the positive side of said DC supply voltage source through said first resistor, said NPN transistor having its base connected to said input terminal, its collector connected to the positive side of said DC supply voltage source through said second resistor and its emitter connected to the negative side of said DC supply voltage source through said third resistor, said second PNP transistor having its base connected to the collector of said NPN transistor, its emitter connected to the positive side of said DC supply voltage source through said second variable resistor and its collector connected to said output terminal, means connected to said input and output terminals and said first PNP transistor and said NPN transistor for providing bias thereto, and means connected between said output terminal and the base of said first PNP transistor for maintaining said input and output terminals at zero potential during periods when no signal is applied to said gyrator input.

2. A direct coupled time variable gyrator as defined in claim 1 wherein said means for providing bias to said first PNP transistor and said NPN transistor comprises second and third NPN transistors; a first Zener diode and variable resistance means, said second NPN transistor having its collector connected to said output terminal, its emitter connected through said variable resistance means to the emitter of said third NPN transistor and its base connected to the base of said third NPN transistor, said third NPN transistor having its collector connected to said input terminal, and said first Zener diode being connected between the base of said second NPN transistor and said variable resistance means.

3. A direct coupled time variable gyrator as defined in claim 2 wherein said means for maintaining said input and output terminals at zero potential comprises a third PNP transistor and a second Zener diode, said third PNP transistor having its base connected to said output terminal and its collector connected to the negative side of said DC supply voltage source, and said second Zener diode being connected between the emitter of said third PNP transistor and the base of said first PNP transistor.